United States Patent
Yoon et al.

(10) Patent No.: US 12,315,974 B2
(45) Date of Patent: May 27, 2025

(54) ELECTROLYTE MEMBRANE OF MEMBRANE-ELECTRODE ASSEMBLY COMPRISING PLASMA-TREATED FILLER AND MANUFACTURING METHOD THEREOF

(71) Applicants: Hyundai Motor Company, Seoul (KR); Kia Corporation, Seoul (KR)

(72) Inventors: Jong Jin Yoon, Gyeonggi-do (KR); Il Seok Chae, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/518,434

(22) Filed: Nov. 3, 2021

(65) Prior Publication Data
US 2022/0255104 A1   Aug. 11, 2022

(30) Foreign Application Priority Data
Feb. 9, 2021   (KR) .................. 10-2021-0017980

(51) Int. Cl.
*H01M 8/1051* (2016.01)
*H01M 8/10* (2016.01)
*H01M 8/1039* (2016.01)
*H01M 8/1081* (2016.01)

(52) U.S. Cl.
CPC ....... *H01M 8/1051* (2013.01); *H01M 8/1039* (2013.01); *H01M 8/1081* (2013.01); *H01M 2008/1095* (2013.01)

(58) Field of Classification Search
CPC ............ H01M 8/1051; H01M 8/1039; H01M 8/1081; H01M 8/1025; H01M 8/1069; H01M 8/1023; H01M 8/1004; H01M 8/102; H01M 8/1032
See application file for complete search history.

(56) References Cited

U.S. PATENT DOCUMENTS

| | | | | |
|---|---|---|---|---|
| 6,083,638 A | * | 7/2000 | Taniguchi | H01M 8/0247 429/513 |
| 2001/0026893 A1 | * | 10/2001 | Asukabe | H01M 8/1023 429/316 |
| 2005/0130006 A1 | * | 6/2005 | Hoshi | H01M 4/8828 429/316 |

(Continued)

FOREIGN PATENT DOCUMENTS

| | | | |
|---|---|---|---|
| JP | 2003157862 A | * | 5/2003 |
| JP | 4977911 B2 | | 7/2012 |
| KR | 101754658 B1 | | 7/2017 |

OTHER PUBLICATIONS

Padmaraj, O., and S. Austin Suthanthiraraj. "A Study of Novel Hydrophobic P(TFE) Particles Dispersed Electrospun Gel Polymer Electrolyte Fibrous Membranes." Ionics 25.8 (2019): 3683-3693. (Year: 2019).*

(Continued)

*Primary Examiner* — Helen Oi K Conley
*Assistant Examiner* — Amanda Rosenbaum
(74) *Attorney, Agent, or Firm* — Fox Rothschild LLP

(57) ABSTRACT

Disclosed are an electrolyte membrane of a membrane-electrode assembly comprising a plasma-treated filler and a manufacturing method thereof. The electrolyte membrane includes an ionomer having a membrane form and a filler dispersed in the ionomer and having a hydrophobic surface.

3 Claims, 2 Drawing Sheets

(56) References Cited

U.S. PATENT DOCUMENTS

| 2005/0214611 | A1* | 9/2005 | Hommura | H01M 8/1041 |
| | | | | 521/27 |
| 2016/0049678 | A1* | 2/2016 | Hogen-Esch | H01M 8/1039 |
| | | | | 429/482 |
| 2018/0145358 | A1* | 5/2018 | Bae | H01M 8/1053 |
| 2019/0022634 | A1* | 1/2019 | Jeong | H01M 50/403 |

OTHER PUBLICATIONS

JP-2003157862-A translation (Year: 2003).*
Park, Jaehyung, et al. "Durability analysis of Nafion/hydrophilic pretreated PTFE membranes for PEMFCs." Journal of the Electrochemical Society 159.12 (2012): F864. (Year: 2012).*
Xi, Zhen-Yu, et al. "Modification of polytetrafluoroethylene porous membranes by electron beam initiated surface grafting of binary monomers." Journal of Membrane Science 339.1-2 (2009): 33-38. (Year: 2009).*
M. Inaba et al., Electrochimica Acta, 2006, 51, 5746-5753.

* cited by examiner

---→ : CLOGGED GAS MOVEMENT PATH

ELECTROLYTE MEMBRANE OF MEMBRANE-ELECTRODE ASSEMBLY COMPRISING PLASMA-TREATED FILLER AND MANUFACTURING METHOD THEREOF

CROSS-REFERENCE TO RELATED APPLICATION

This application claims under 35 U.S.C. § 119(a) the benefit of priority to Korean Patent Application No. 10-2021-0017980 filed on Feb. 9, 2021, the entire contents of which are incorporated herein by reference.

TECHNICAL FIELD

The present invention relates to an electrolyte membrane of a membrane-electrode assembly including a plasma-treated filler and a manufacturing method thereof.

BACKGROUND

An electrolyte membrane constituting a proton exchange membrane fuel cell (PEMFC) has electrically insulating performance, and serves to prevent gas crossover and conduct hydrogen ions.

In an actual fuel cell operating environment, the gas crossover through the electrolyte membrane partially occurs, and the degree of gas crossover varies depending on fuel cell operating conditions.

The operating conditions that affect the gas crossover include fuel cell operating temperature, humidity, gas pressure, and operating time. A degradation mechanism of the electrolyte membrane is attributed to the generation of heat by hydrogen crossover, the production of hydrogen peroxide and the resulting catalytic combustion reactions. Hydrogen peroxide is most likely to be produced by crossover of oxygen gas, resulting in a catalytic combustion reaction on an anode side.

In the related art, a method of manufacturing an electrolyte membrane for a fuel cell, and more particularly, to a method of manufacturing a PTFE electrolytic membrane for a fuel cell has been reported. For example, impregnation of a conductive ionomer is facilitated by modifying a surface of a support made of a fluorine-based polytetrafluoroethylene (PTFE) material with a plasma treatment, and physical properties are improved by forming each conductive ionomer layer on both sides of the support.

Conventionally, modifying the support made of a fluorine-based PTFE material of such an electrolyte membrane for a fuel cell with the plasma treatment, is a method for facilitating impregnation of the conductive ionomer by securing hydrophilicity due to the plasma treatment, and has an object of improving a manufacturing process.

In addition, another method has been reported in the related art. For example, a powder for an electrode catalyst applied to a fuel battery cell composed of a mixture of Pt/C and PTFE may be prepared so that a PTFE content in the mixture is in the range of 6.9 to 8.0% by weight, and the powder for an electrode catalyst was combined with an Ir or Ir oxide powder as a metal weight ratio so that Pt:Ir=90:20 to 10 and a membrane-electrode assembly was made from a slurry mixed with Nafion's dispersions.

The above document relates to a manufacturing method for facilitating ionomer impregnation by utilizing a plasma treatment technique for a PTFE support. The above method prevents clogging of an oxygen supply path due to condensation of moisture or reaction water in humidified gas in an oxygen electrode by adding PTFE to a cathode electrode.

SUMMARY

In preferred aspects, provided are an electrolyte membrane with reduced gas permeability and a manufacturing method thereof.

In one aspect, an electrolyte membrane suitably used in a membrane-electrode assembly is provided, the electrolyte membrane comprising: an ionomer having a membrane form; and filler comprising hydrophobic surfaces and admixed with the ionomer.

In one aspect, an electrolyte membrane of a membrane-electrode assembly may include an ionomer having a membrane form, and fillers dispersed in the ionomer and having hydrophobic surfaces.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., having moisture channel.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The ionomer may include a moisture channel, which is a path through which moisture existing in the membrane moves, and the filler may be located in the moisture channel.

The ionomer may include a matrix for moving hydrogen ions, and a filler may be located in the matrix.

The ionomer may include one or more selected from the group consisting of a perfluorinated sulfonic acid (PFSA) ionomer, a sulfonated poly(arylene ether sulfone) (SPAES) ionomer, and a sulfonated poly(ether ether ketone) (SPEEK) ionomer.

The filler may include one or more selected from the group consisting of polytetrafluoroethylene (PTFE), polyethylene, and polypropylene.

The filler may have a particle form having an average particle diameter (D50) of about 20 nm or less.

The electrolyte membrane may include an amount of about 5% to 10% by weight of the filler based on the total weight the electrolyte membrane.

The filler may prevent gas from moving through the moisture channel.

In one aspect, a method of manufacturing an electrolyte membrane of a membrane-electrode assembly is provided, where the method may comprise: a) plasma treating fillers with plasma, for example to make the surface of the fillers more hydrophobic such as by producing one or more hydrophobic groups such as alkane groups or by other surface modification; b) admixing the plasma-treated fillers with ionomers; and c) applying the admixture in a membrane form onto a substrate to manufacture the electrolyte membrane.

In another aspect, a method of manufacturing an electrolyte membrane of a membrane-electrode assembly may include treating surfaces of fillers with plasma to make the surfaces hydrophilic, dispersing the fillers having the surfaces made to be hydrophilic in an ionomer solution to obtain a dispersion; and applying the dispersion in a membrane form onto a substrate to manufacture the electrolyte membrane.

The surface of the filler suitably may be made to be hydrophilic by treating the filler with a capacitively coupled plasma process in an oxygen atmosphere.

As referred to herein, hydrophobicity (including surface hydrophobicity of fillers) is measured by a test of the water contact angle using a goniometer. A measured drop of liquid (e.g., de-ionized pure water) is dispensed onto a given surface and the angle at which the fluid contacts the surface is then measured. The higher the contact angle, the more the drop does not spread on the surface and the more hydrophobic the surface. In generally preferred aspects, filler surface will be 3, 5, 10, 15, 20, 30, 40, 50, 60 or 700 percent or more higher water contact angle by the above water droplet test following plasma treatment as disclose herein. In certain aspects, for a surface to be considered hydrophobic the contact angle should be greater than 90 degrees[2].

The capacitively coupled plasma process may be performed for about 2 to 5 minutes at a chamber pressure of 50 mTorr to 150 mTorr and a plasma power of about 100 W to 500 W.

The filler having the surface treated with the plasma to be made to be hydrophilic may be located in a moisture channel, which is a path through which moisture existing in an ionomer having the membrane form moves, and lose hydrophilicity thereof over time, resulting in expression of hydrophobicity.

An electrolyte membrane may be manufactured by dispersing the hydrophilized filler in the ionomer solution within about 30 minutes and applying the dispersion in the membrane form onto a substrate.

Hydrophobic fillers not subjected to the plasma treatment may be dispersed in the ionomer solution together with the fillers having the surfaces made to be hydrophilic.

According to the present invention, gas permeability of the electrolyte membrane may be reduced, and thus deterioration of the electrolyte membrane due to gas crossover may be effectively prevented.

The effect of the present invention is not limited to the above-mentioned effect. It should be understood that the effect of the present invention includes all effects that can be inferred from the following descriptions.

Other aspects of the invention are disclosed infra.

DETAILED DESCRIPTION

Figure 1:
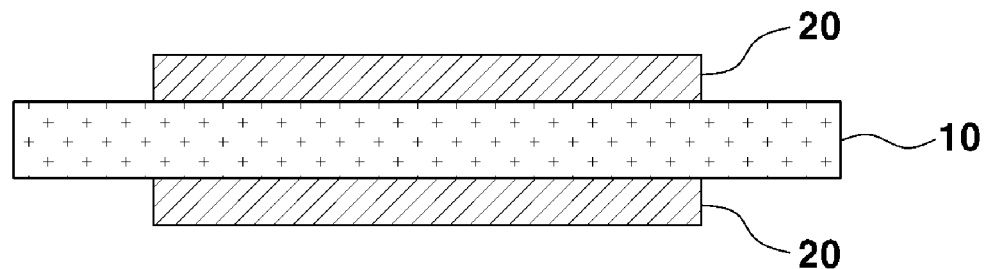
FIG. 1 shows an exemplary membrane-electrode assembly according to an exemplary embodiment of the present invention.

The above objects, other objects, features, and advantages of the present invention will be easily understood through the following preferred embodiments related to the accompanying drawings. The present invention, however, is not limited to exemplary embodiments described herein and may be embodied in other forms. On the contrary, exemplary embodiments introduced herein are provided to make disclosed contents thorough and complete and sufficiently transfer the spirit of the present invention to those skilled in the art.

Similar reference numerals have been used for similar elements in describing each drawing. In the accompanying drawings, dimensions of structures may be enlarged as compared with actual dimensions for clarity of the present invention. The terms first, second, etc. may be used to describe various components, but the components are not to be interpreted to be limited to the terms. The terms are used only to distinguish one component from another component. For example, a first component may be referred to as a second component and the second component may also be similarly referred to as the first component, without departing from the scope of the present invention. Singular forms are intended to include plural forms unless the context clearly indicates otherwise.

It should be understood that term "comprise" or "have", etc. as used herein, specify the presence of features, numerals, steps, operations, components, parts mentioned herein, or combinations thereof described on the specification, but do not preclude the presence or addition of one or more other features, numerals, steps, operations, components, parts, or combinations thereof. When an element such as a layer, a film, a region, or a substrate, is referred to as being "on" another element, it may be "directly on" another element or may have an intervening element present therebetween. In contrast, when an element such as a layer, a film, a region, or a substrate is referred to as being "under" another element, it can be "directly under" the other element or intervening elements may also be present.

It should be understood that unless otherwise specified, all numbers, values and/or expressions expressing quantities of ingredients, reaction conditions, polymer compositions and formulations used herein are approximations reflecting various uncertainties of the measurement that these numbers result from obtaining these values, among other things essentially, and are therefore modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are invention herein, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In the related arts, typically the thicker the electrolyte membrane, the lower the gas permeability. However, when the electrolyte membrane is thick, conductivity of hydrogen ions is decreased, resulting in poor performance of the membrane-electrode assembly.

In addition, when an operating temperature and an operating pressure of the membrane-electrode assembly are increased, gas permeability is increased. In particular, when the operating temperature and operating pressure are simultaneously increased, gas permeability is rapidly increased. Thus, in order to increase durability of the membrane-electrode assembly, there is a need for a new technology capable of suppressing gas permeation under various operating conditions.

FIG. 1 shows an exemplary membrane-electrode assembly according to an exemplary embodiment of the present invention. The membrane-electrode assembly may include an electrolyte membrane 10 and a pair of electrodes 20 formed on both surfaces of the electrolyte membrane 10.

The electrolyte membrane 10 may include an ionomer having a membrane form and a filler dispersed in the ionomer and having a hydrophobic surface.

The ionomer may transfer hydrogen ions between the pair of electrodes 20 and prevent fuel gas and oxygen from being directly mixed.

The ionomer may include a polymer material having hydrogen ion conductivity and is not particularly limited in its kind. For example, the ionomer may include one or more selected from the group consisting of a perfluorinated sulfonic acid (PFSA) ionomer, a sulfonated poly(arylene ether sulfone) (SPAES) ionomer, and a sulfonated poly(ether ether ketone) (SPEEK) ionomer. Preferably, a perfluorinated sulfonic acid-based polymer such as Nafion may be used as the ionomer.

Figure 2:
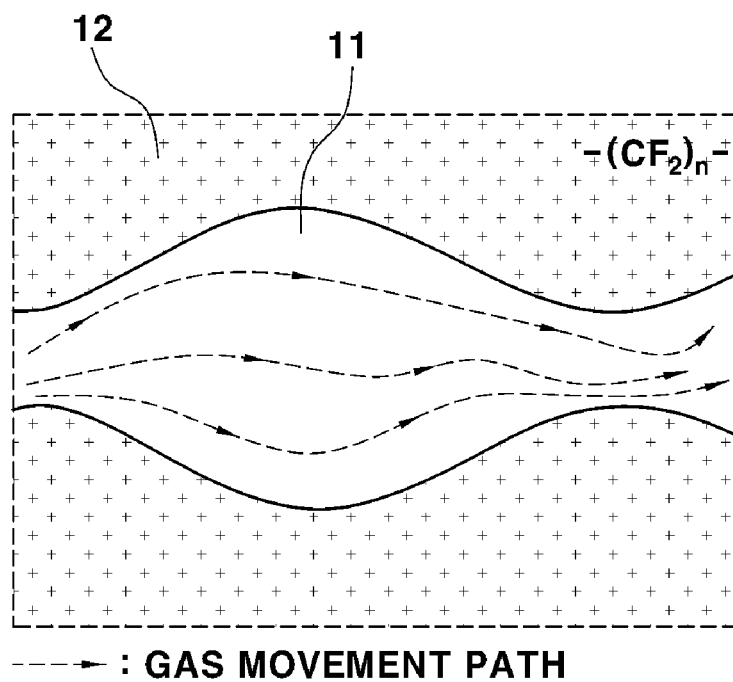
FIG. 2 shows an exemplary moisture channel, which is a path through which moisture existing in an ionomer having a membrane form moves, and a matrix for transferring hydrogen ions, which is a portion other than the moisture channel.

FIG. 2 shows a moisture channel 11, which is a path through which moisture existing in the ionomer having the membrane form moves; and a matrix 12 for transferring hydrogen ions, which is the rest except for the moisture channel 11.

The moisture channel 11 may be a passage for discharging water generated by an electrochemical reaction in the membrane-electrode assembly and water generated when a humid fuel gas is introduced from the outside, to the outside. In this case, gas such as fuel gas and oxygen in addition to water, may move through the moisture channel 11 to cause gas crossover within the electrolyte membrane 10. The present invention is to solve the above problems, and specific means thereof will be described later.

The matrix 12 refers to a portion other than the moisture channel 11 in the ionomer having the membrane form.

Figure 3:
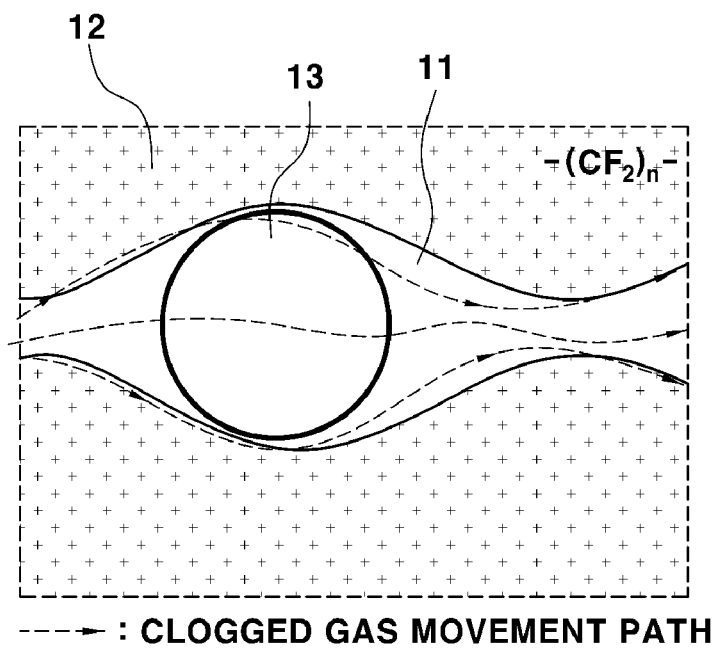
FIG. 3 shows an exemplary filler located in the moisture channel of FIG. 2.

FIG. 3 shows an exemplary filler 13 located in the moisture channel 11. Since the filler 13 is present in the moisture channel 11, gas crossover may be prevented due to the movement of gas through the moisture channel 11 described above. In addition, the filler 13 may have a hydrophobic surface, and thus does not prevent water from moving through the moisture channel 11. However, since the filler 13 has a hydrophobic surface, when the filler 13 is simply dispersed in the ionomer, it cannot be located in the moisture channel 11. The present invention is characterized in that the surface of the filler 13 is subjected to plasma treatment to make it hydrophilic temporarily so that the filler 13 may be located in the moisture channel 11. This will be described below.

Meanwhile, the filler 13 may also be located in the matrix 12. Since the filler 13 is a polymer particle having a high crystallinity, dispersing the filler 13 into the matrix 12 may increase the crystallinity of the electrolyte membrane 10 itself, thereby further reducing the gas permeability of the electrolyte membrane 10.

The filler 13 may include a highly crystalline polymer. Particularly, the filler 13 may include one or more selected from the group consisting of polytetrafluoroethylene (PTFE), polyethylene, and polypropylene. Preferably, polytetrafluoroethylene (PTFE) may be used as the filler 13.

The polytetrafluoroethylene (PTFE) may include a highly crystalline polymer of about 96% to 98%, and has a hexagonal crystal structure at a temperature of about 19° C. or greater, which makes it soft and easy to change.

The filler 13 has a particle form and may have an average particle diameter (D50) of about 20 nm or less. When the average particle diameter (D50) of the filler 13 is greater than about 20 nm, it may be difficult for the filler 13 to be located in the moisture channel 11.

The electrolyte membrane 10 may include an amount of about 5% to 10% by weight of the filler 13 based on the total weight. When the content of the filler 13 is less than about 5% by weight, the effect of preventing gas crossover may be insufficient, and when the content of the filler 13 is greater than about 10% by weight, it may have an influence on performance of the electrolyte membrane 10, such as a decrease in hydrogen ion conductivity in the electrolyte membrane 10.

A method of manufacturing an electrolyte membrane of a membrane-electrode assembly according to an exemplary embodiment of the present invention may include treating surfaces of fillers with plasma to make the surfaces hydrophilic, dispersing the fillers having the surfaces made to be hydrophilic in an ionomer solution to obtain a dispersion; and applying the dispersion in a membrane form onto a substrate to manufacture the electrolyte membrane.

The filler may be treated with plasma in an oxygen atmosphere to make the surface of the filler hydrophilic. Particularly, the plasma treatment may create hydrophilic functional groups such as hydroxyl group (—OH) and carboxyl group (—COOH) on the surface of the filler so that the filler maintains temporary hydrophilicity. The hydrophilicity retention time of the filler may be about 30 minutes to 20 hours.

The plasma treatment may be a capacitively coupled plasma process. The capacitively coupled plasma mode may generate plasma using an electric field without using a magnetic field, and may generate various types of plasma according to a method of applying a radio frequency (RF). In addition, since there is no direct contact between the electrode and the plasma, the plasma process is suitable for mass production due to its high purity and excellent processability.

The capacitively coupled plasma process may be performed for about 2 to 5 minutes at a chamber pressure of about 50 mTorr to 150 mTorr and a plasma power of about 100 W to 500 W. When the chamber pressure is greater than about 150 mTorr, the content of impurities other than oxygen may be increased. In addition, the higher the numeral value of the plasma power, the more advantageous it is to generate the plasma. A higher power may be applied according to the improvement of the equipment performance, but it may preferably be performed at a power of about 500 W or less.

Subsequently, the fillers having the surfaces made to be hydrophilic may be dispersed in an ionomer solution to obtain a dispersion, and the dispersion may be applied in the membrane form on the substrate to manufacture an electrolyte membrane.

The filler having the surface treated with the plasma to be made to be hydrophilic may be located in the aforementioned moisture channel within the electrolyte membrane. Subsequently, the hydrophilized filler loses hydrophilicity thereof over time, resulting in expression of hydrophobicity. Thus, since the filler needs to maintain hydrophilicity until the dispersion is applied, it may be preferable to disperse the hydrophilized filler in the ionomer solution within 30 minutes.

In addition, when a dispersion is prepared by dispersing the hydrophilized filler in the ionomer solution, a hydrophobic filler not subjected to the plasma treatment may be added together to prepare the dispersion. The hydrophobic filler may be dispersed in the matrix rather than the moisture channel when the electrolyte membrane is manufactured.

After the dispersion is applied in the membrane form on the substrate, drying and heat treatment may be performed. The conditions of drying and heat treatment are not particularly limited, for example, drying at a temperature of about 80° C. for about 1 hour, followed by heat treatment at about 150° C. for about 1 hour.

Although exemplary embodiments of the present invention have been described with reference to the accompanying drawings, those skilled in the art will understand that the present invention can be implemented in other specific forms without changing the technical spirit or essential features. Therefore, it is to be understood that exemplary embodiments described hereinabove are illustrative rather than being restrictive in all aspects.

What is claimed is:

1. An electrolyte membrane of a membrane-electrode assembly for fuel cells, comprising:
    an ionomer having a membrane form and comprising a moisture channel which is a path through which moisture existing in the membrane moves;
    a filler comprising polytetrafluoroethylene (PTFE) and having hydrophobic surfaces,
    wherein the filler is plasma-treated to be temporarily hydrophilic and then admixed with the ionomer such that the filler is located in the moisture channel and the filler is to be hydrophobic surfaces after being located in the moisture channel to prevent or inhibit gas from moving through the moisture channel,
    wherein the filler has a particle form, and
    wherein the ionomer comprises one or more selected from the group consisting of a perfluorinated sulfonic acid (PFSA) ionomer, a sulfonated poly(arylene ether sulfone) (SPAES) ionomer, and a sulfonated poly(ether ether ketone) (SPEEK) ionomer.

2. The electrolyte membrane of claim 1, wherein the filler has an average particle diameter (D50) of about 20 nm or less.

3. The electrolyte membrane of claim 1, wherein the electrolyte membrane comprises an amount of about 5% to 10% by weight of the filler based on the total weight of the electrolyte membrane.

* * * * *